(12) United States Patent
Wang et al.

(10) Patent No.: US 8,977,869 B2
(45) Date of Patent: Mar. 10, 2015

(54) METHOD AND SYSTEM FOR CONTROLLING POWER OF AN IC CHIP BASED ON RECEPTION OF SIGNAL PULSE FROM A NEIGHBORING CHIP

(75) Inventors: Jingguang Wang, Irvine, CA (US); Derek Tam, Irvine, CA (US); Mark Berman, Newport Coast, CA (US); Siavash Fallahi, Newport Coast, CA (US)

(73) Assignee: Broadcom Corporation, Irvine, CA (US)

( * ) Notice: Subject to any disclaimer, the term of this patent is extended or adjusted under 35 U.S.C. 154(b) by 782 days.

(21) Appl. No.: 13/037,462

(22) Filed: Mar. 1, 2011

(65) Prior Publication Data

US 2012/0223765 A1 Sep. 6, 2012

(51) Int. Cl.
*G06F 1/00* (2006.01)
*G06F 1/32* (2006.01)

(52) U.S. Cl.
CPC .................................... *G06F 1/3206* (2013.01)
USPC .......................................................... 713/300

(58) Field of Classification Search
CPC ................................................... G06F 1/3206
USPC .......................................................... 713/300
See application file for complete search history.

(56) References Cited

U.S. PATENT DOCUMENTS

| | | | | |
|---|---|---|---|---|
| 3,846,646 A | * | 11/1974 | Peters | 327/520 |
| 5,383,067 A | * | 1/1995 | Choi | 360/72.2 |
| 5,619,128 A | * | 4/1997 | Heger | 324/67 |
| 2001/0011881 A1* | | 8/2001 | Emori et al. | 320/116 |
| 2002/0107054 A1* | | 8/2002 | Fujisawa et al. | 455/573 |
| 2002/0114047 A1* | | 8/2002 | McBrien et al. | 359/180 |
| 2004/0041601 A1* | | 3/2004 | Payne et al. | 327/143 |
| 2009/0282277 A1* | | 11/2009 | Sedarat et al. | 713/320 |
| 2010/0168583 A1* | | 7/2010 | Dausch et al. | 600/466 |
| 2011/0026416 A1* | | 2/2011 | Tazebay et al. | 370/252 |

* cited by examiner

*Primary Examiner* — Mohammed Rehman

(74) *Attorney, Agent, or Firm* — Oblon, McClelland, Maier & Neustadt, L.L.P.

(57) ABSTRACT

While an IC chip is in idle mode with no power being supplied to the IC chip, the IC chip may be operable to detect a signal pulse received by the IC chip using energy associated with the signal pulse. The IC chip may be operable to control a control signal for a power switch using the energy associated with the signal pulse. The power switch may allow power to be provided to the IC chip based on the control signal. The IC chip may comprise a pulse detector, a latch circuit and an ON/OFF logic circuit within the IC chip. While the IC chip is fully powered and communication with a partner chip is finished, the IC chip may be operable to control the control signal to turn off the power switch for powering down the IC chip based on a turn-off signal.

18 Claims, 7 Drawing Sheets

METHOD AND SYSTEM FOR CONTROLLING POWER OF AN IC CHIP BASED ON RECEPTION OF SIGNAL PULSE FROM A NEIGHBORING CHIP

CROSS-REFERENCE TO RELATED APPLICATIONS/INCORPORATION BY REFERENCE

[Not applicable]

FIELD OF THE INVENTION

Certain embodiments of the invention relate to IC chips. More specifically, certain embodiments of the invention relate to a method and system for passive signal detector for chip auto power on and power down.

BACKGROUND OF THE INVENTION

An integrated circuit (IC) chip is a miniaturized electronic circuit that has been manufactured in the surface of a thin substrate of semiconductor materials. An IC chip may comprise mainly semiconductor components and passive components. IC chips are used in almost all electronic devices in use today. Computers, network devices, communication devices and many other digital appliances may be made possible by the low cost of production of IC chips. IC chips may contain anything from one to millions of logic gates, flip-flops, multiplexers, and other circuits in a few square millimeters, for example.

An IC chip in a system such as, for example an Ethernet PHY chip in an Ethernet system, may be sometimes in an idle or standby mode. For example, most of the time, the Ethernet system is just in the standby mode to monitor the upcoming communication events. Because of the leakage current in MOS technology such as, for example, in CMOS technology, electrical power may still be consumed by the chip while the chip is in the idle or standby mode.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for passive signal detector for chip auto power on and power down, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain embodiments of the invention can be found in a method and system for passive signal detector for chip auto power on and power down. In various embodiments of the invention, while an IC chip is in idle mode with no power being supplied to the IC chip, the IC chip may be operable to detect a signal pulse received by the IC chip using energy associated with the signal pulse. The IC chip may be operable to control a control signal for a power switch using the energy associated with the signal pulse. The power switch may allow power to be provided to the IC chip based on the control signal. In this regard, the IC chip may comprise a pulse detector, a latch circuit and an ON/OFF logic circuit within the IC chip. The power switch may comprise one of an off-chip power field-effect transistor (FET) coupled to the IC chip, an on-chip power FET within the IC chip, an off-chip electronic regulator coupled to the IC chip and/or an on-chip electronic regulator within the IC chip.

The IC chip may be operable to amplify the detected signal pulse by level shifting with a DC bias voltage using the pulse detector. The IC chip may generate a latch signal to turn on the latch circuit by holding the amplified signal pulse for a first particular time period using the pulse detector. While the latch circuit is turned on by the latch signal, the control signal may be pulled down by the IC chip from a high voltage to a low voltage to turn on the power switch for powering on the IC chip, using the latch circuit. The control signal may then be held at the low voltage by the IC chip for a second particular time period during the powering on of the IC chip using the latch circuit. While the IC chip is provided with a voltage that turns on the ON/OFF logic circuit during the powering on of the IC chip, the control signal may be further pulled down by the IC chip from the low voltage to zero voltage until the IC chip is fully powered, using the ON/OFF logic circuit.

While the IC chip is fully powered and communication with a partner chip is finished, the IC chip may be operable to pull up the control signal from zero voltage to the high voltage to turn off the power switch for powering down the IC chip based on a turn-off signal, using the ON/OFF logic circuit. The control signal may then be held by the IC chip at the high voltage for a third particular time period during the powering down of the IC chip until the IC chip is completely powered down, using the ON/OFF logic circuit.

Figure 1:
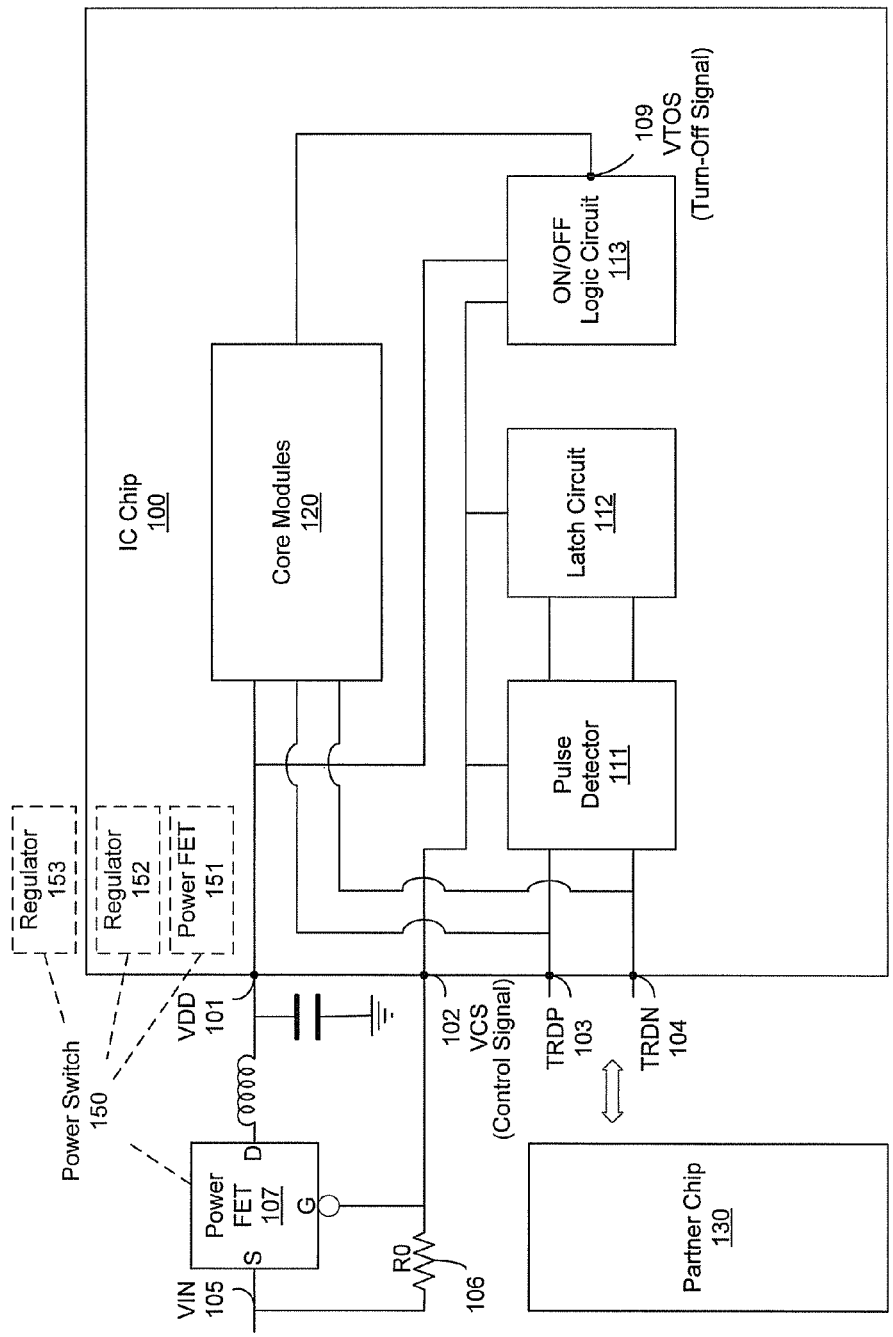
FIG. 1 is a block diagram illustrating an exemplary IC chip that is operable to provide passive signal detector for chip auto power on and power down, in accordance with an embodiment of the invention.

FIG. 1 is a block diagram illustrating an exemplary IC chip that is operable to provide passive signal detector for chip auto power on and power down, in accordance with an embodiment of the invention. Referring to FIG. 1, there is shown an IC chip 100, a partner chip 130, a power switch 150, of which a power FET 107 is illustrated, and a resistor R0 106. The IC chip 100 may comprise a plurality of core modules 120, a pulse detector 111, a latch circuit 112 and an ON/OFF logic circuit 113. The IC chip is coupled to the power FET 107 via a terminal VDD 101. The IC chip 100 may be operable to communicate with the partner chip 130 via a pair of terminals TRDP 103 and TRDN 104.

The power FET 107 may be a PFET low-voltage switch. A control signal at a terminal VCS 102 may control the power FET 107. While the power FET 107 is turned on by the control signal, a power may be provided to the IC chip 100 via the terminal VDD 101. For example, a high voltage such as 3.3 V high voltage may be supplied at a terminal VIN 105. The resistor R0 106 may, for example, have a value of 4.7K ohms. A 3.3V control signal at the terminal VCS 102 may turn the power FET 107 off. In such an instance, no power or 0 V is provided at the terminal VDD 101. While the control signal is pulled down by the IC chip 100 from 3.3 V to a low voltage or 0V, the power FET 107 may be turned on. The control signal may be pulled down by the pulse detector 111, the latch circuit 112 and the ON/OFF logic circuit 113 within the IC chip 110, for example. In such an instance, a power or 3.3V may be provided at the terminal VDD 101 for the IC chip 100.

The core modules 120 may comprise suitable logic, circuitry, interfaces and/or code that may be operable to perform core functions of the IC chip 100. For example, the IC chip 100 may be an Ethernet PHY chip. In this instance, the core modules 120 may comprise, for example, a transmitter, a receiver, a decoder, an encoder, a media independent interface (MII) manager, a LED controller and/or a voltage regular. The IC chip 100 may also be a communication system chip, for example. In such an instance, the core modules 120 may comprise, for example, a PHY circuit, a MAC circuit and/or other network components.

The pulse detector 111 may comprise suitable logic, circuitry, interfaces and/or code that may be operable to detect a pulsed incoming signal received by the IC chip 100, while the IC chip 100 is in idle mode with no power being supplied to the IC chip 100 or with 0 V at the terminal VDD 101. The IC chip 100 may receive the pulsed incoming signal from a partner chip such as the partner chip 130, for example. The incoming signal pulse may be detected by the pulse detector 111 based on energy associated with the incoming signal pulse. The incoming signal pulse may be a differential signal pair at terminals TRDP 103 and TRDN 104. In an exemplary embodiment of the invention, the incoming signal may comprise a single pulse with a width greater than 20 nsec and a differential peak swing greater than 600 mV. The pulse detector 111 may be operable to amplify the detected signal pulse by level shifting with a DC bias voltage such as, for example, a 400 mV bias voltage. A latch signal may be generated by the pulse detector 111 to turn on the latch circuit 112. The latch signal may be generated by holding the amplified signal pulse for a first particular time period so as to turn on the latch circuit 112.

The latch circuit 111 may comprise suitable logic, circuitry, interfaces and/or code that may be operable to pull down the control signal at the terminal VCS 102 from a high voltage to a low voltage to turn on the power FET 107 for powering on the IC chip 100. In an exemplary embodiment of the invention, the control signal may be pulled down by the latch circuit 112 from 3.3 V high voltage to a low voltage between 0.7 V-1 V. The latch circuit 111 may be operable to hold the control signal at the 0.7 V-1 V low voltage for a second particular time period during the powering on of the IC chip 100.

The ON/OFF logic circuit 113 may comprise suitable logic, circuitry, interfaces and/or code that may be operable to control the control signal at the terminal VCS 102 during a powering on or a powering down of the IC chip 100. While the terminal VDD 101 is provided with a voltage high enough to turn on the ON/OFF logic circuit 113 during the powering on of the IC chip 100, the ON/OFF logic circuit 113 may be operable to further pull down the control signal at the terminal VCS 102 from the low voltage (0.7 V-1 V) to zero voltage (0 V) until the IC chip 100 is fully powered such as, for example, with 3.3 V at the terminal VDD 101.

While the IC chip 100 is fully powered and communication with the partner chip 130 is finished or stopped, the ON/OFF logic circuit 113 may be operable to pull up the control signal at the terminal VCS 102 from zero voltage (0 V) to a high voltage such as 3.3 V high voltage to turn off the power FET 107 for powering down the IC chip 100, based on a turn-off signal at a terminal VTOS 109. In this regard, for example, a high voltage turn-off signal at the terminal VTOS 109 may indicate that the communication between the IC chip 100 and the partner chip 130 is finished or stopped. The control signal may then be held by the ON/OFF logic circuit 113 at the high voltage for a third particular time period during the powering down of the IC chip 100 until the IC chip 100 is completely powered down. While the IC chip 100 is completely powered down, the terminal VDD 101 is provided with 0 V.

In operation, while the power switch 150 such as the power FET 107 is off and the IC chip 100 is in idle mode with no power being supplied to the IC chip 100 or with 0 V at the terminal VDD 101, the pulse detector 111 may be operable to detect a pulsed incoming signal received by the IC chip 100. The IC chip 100 may receive the pulsed incoming signal from the partner chip 130, for example. The incoming signal pulse may be detected by the pulse detector 111 based on energy associated with the incoming signal pulse. The incoming signal pulse may be a differential signal pair at terminals TRDP 103 and TRDN 104. In an exemplary embodiment of the invention, the incoming signal may comprise a single pulse with a width greater than 20 nsec and a differential peak swing greater than 600 mV. The pulse detector 111 may be operable to amplify the detected signal pulse by level shifting with a DC bias voltage such as, for example, a 400 mV bias voltage. A latch signal may be generated by the pulse detector 111 to turn on the latch circuit 112. The latch signal may be generated by holding the amplified signal pulse for a first particular time period so as to turn on the latch circuit 112.

While the latch circuit 112 is turned on by the latch signal, the latch circuit 111 may be operable to pull down the control signal at the terminal VCS 102 from a high voltage to a low voltage to turn on the power FET 107 for powering on the IC chip 100. In an exemplary embodiment of the invention, the control signal may be pulled down by the latch circuit 112 from 3.3 V high voltage to a low voltage between 0.7 V-1 V. The latch circuit 111 may be operable to hold the control signal at the 0.7 V-1 V low voltage for a second particular time period during the powering on of the IC chip 100.

While the terminal VDD 101 is provided with a voltage high enough to turn on the ON/OFF logic circuit 113 during the powering on of the IC chip 100, the ON/OFF logic circuit 113 may be operable to further pull down the control signal at the VCS 102 from the low voltage (0.7 V-1 V) to zero voltage (0 V) until the IC chip 100 is fully powered such as, for example, with 3.3 V at the terminal VDD 101.

While the IC chip 100 is fully powered and communication with the partner chip 130 is finished or stopped, the ON/OFF logic circuit 113 may be operable to pull up the control signal at the terminal VCS 102 from zero voltage (0 V) to a high voltage such as 3.3 V high voltage to turn off the power FET 107 for powering down the IC chip 100, based on a turn-off signal at a terminal VTOS 109. In this regard, for example, a high voltage turn-off signal at the terminal VTOS 109 may indicate that the communication between the IC chip 100 and the partner chip 130 is finished or stopped. The control signal may then be held by the ON/OFF logic circuit 113 at the high voltage for a third particular time period during the powering, down of the IC chip 100 until the IC chip 100 is completely powered down. While the IC chip 100 is completely powered down, the terminal VDD 101 is provided with 0 V.

Although an off-chip power FET 107 is illustrated as the power switch 150 in FIG. 1, the invention may not be so limited. Accordingly, an on-chip power FET 151, an on-chip electronic regulator 152 or an off-chip electronic regulator 153 may be illustrated as the power switch 150 without departing from the spirit and scope of various embodiments of the invention.

Figure 2:
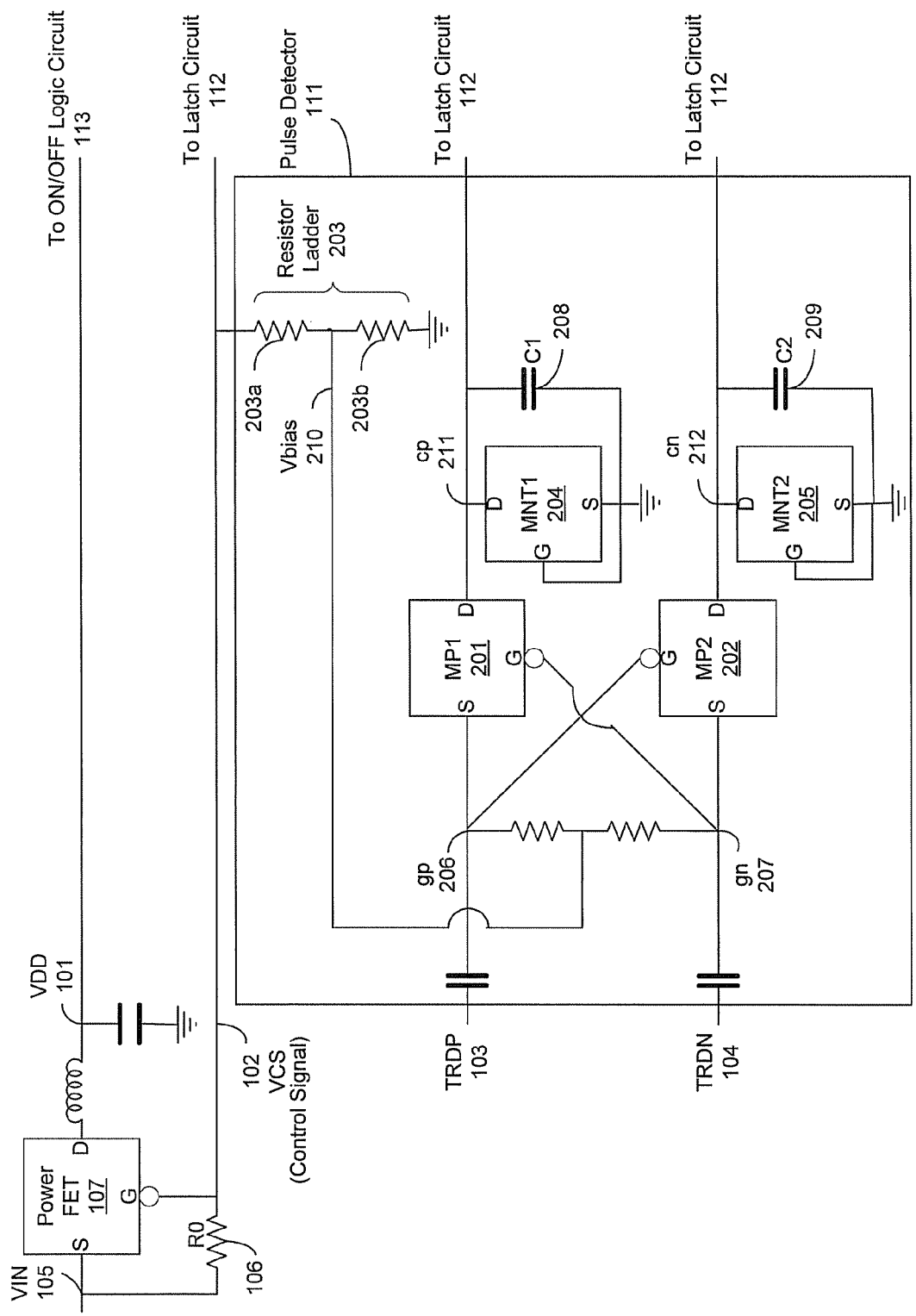
FIG. 2 is a block diagram illustrating an exemplary pulse detector that is operable to provide passive signal detector for chip auto power on and power down, in accordance with an embodiment of the invention.

FIG. 2 is a block diagram illustrating an exemplary pulse detector that is operable to provide passive signal detector for chip auto power on and power down, in accordance with an embodiment of the invention. Referring to FIG. 2, there is shown a pulse detector 111, a power FET 107 and a resistor R0 106. The pulse detector 111 may comprise a PMOS-FET MP1 201, a PMOS-FET MP2 202, a native NMOS-FET MNT1 204, a native NMOS-FET MNT2 205 and a resistor ladder 203. The resistor ladder 203 may comprise a resistor 203a and a resistor 203b.

The PMOS transistor MP1 201 and the PMOS transistor MP2 202 may function as PMOS switches. The native NMOS transistor MNT1 204 and a capacitor C1 208 may be used as a loading of the switch MP1 201. The native NMOS transistor MNT2 205 and a capacitor C2 209 may be used as a loading of the switch MP2 202. In an exemplary embodiment of the invention, a 3.3 V may be supplied at a source terminal VIN 105 of the power FET 107. The resistor R0 may, for example, have a value of 4.7K ohms. The resistor 203a may, for example, have a value of 1450K ohms and the resistor 203b may, for example, have a value of 200K ohms.

In exemplary operation, while an IC chip 100 which comprises the pulse detector 111 is in idle mode, the power FET 107 is off and a terminal VCS 102 is at 3.3 V. The cross coupled PMOS switches MP1 201 and MP2 202 are off. The left side of the PMOS switch MP1 201/MP2 202 is biased at, for example, 400 mV Vbias 210 which is divided down from 3.3 V at the terminal VCS 102 using the resistor ladder 203. The ground gated native NMOS transistor MNT1 204 and the ground gated native NMOS transistor MNT2 205 are used as the loading of the switches MP1 201 and MP2 202 respectively. The transistor MNT1 204 and the transistor MNT2 205 may both have threshold voltages close to 0 V and which may be implemented in standard MOS process. A drain to source resistance (Rds) of the ground gated native transistor MNT1 204 or MNT2 205 may be much smaller than a turn off resistance of the switch MP1 201 or MP2 202. In this regard, a drain terminal cp 211 of the switch MP1 201 or a drain terminal cn 212 of the switch MP2 202 may not see the voltage Vbias 210 and may be at a voltage which is almost 0 V.

In instances when the IC chip 100 starts to communicate with a partner chip such as the partner chip 130, a differential signal pair may be AC coupled from terminals TRDP 103 and TRDN 104. In this regard, the signal on the terminal TRDP 103 may be a positive pulse with a positive voltage namely +Vpulse and on the terminal TRDN 104 may be a negative pulse with a negative voltage namely −Vpulse. Signal voltages on the terminals gp 206 and gn 207 may be expressed utilizing the following exemplary relationships:

$$Vgp=Vbias\ 210+(+Vpulse) \quad (1)$$

$$Vgn=Vbias\ 210+(-Vpulse) \quad (2)$$

In instances when an amplitude of the differential signal is larger than the switch MP1 201 threshold voltage and the switch MP2 202 threshold voltage, the voltage difference between the terminal gp 206 and the terminal gn 207 may turn on the switch MP1 201 or the switch MP2 202 and the differential signal may be detected by the pulse detector 111. In this regard, for example, a peak voltage on the terminal gp 206 may be sampled on the capacitor C1 208 and a voltage on the drain terminal cp 211 may be expressed utilizing the following exemplary relationship:

$$Vcp=Vgp=Vbias\ 210+(+Vpulse) \quad (3)$$

As long as the PMOS switch MP1 201 is turned on, the voltage on the drain terminal cp 211 is not just the voltage of the input positive pulse, but it is level shifted by the DC bias voltage Vbias 210. In this regards, the voltage Vcp on the drain terminal cp 211 may turn on a latch circuit such as the latch circuit 112 in the IC chip 100 very easily.

When a drain to source voltage (Vds) of the native NMOS transistor MNT1 204 or MNT2 205 is small in idle mode, the ground gated native NMOS transistor MNT1 204 or MNT2 205 may be in triode region, the drain to source resistance (Rds) is relatively small. The small resistance from the drain terminal cp 211 or the drain terminal cn 212 to ground can make the DC bias voltage on these two terminals close to 0 V to avoid falsely turning on the following latch circuit 112. When the incoming signal pulse is sampled and the drain to source voltage (Vds) is larger, the native NMOS transistor MNT1 204 or MNT2 205 is operating in their corresponding saturation regions. The drain to source current (Ids) may become constant and the drain to source resistance (Rds) (DC resistance) is linearly increased with larger drain to source voltage (Vds). For example, in instance when the drain to source voltage (Vds) is changed from 0 V to 0.7 V, the drain to source resistance (Rds) may be about 10 times larger. The large R-C time constant on the drain terminal cp 211 may hold the sampled signal pulse for a long time to form a latch signal so as to turn on the latch circuit 112.

Figure 3:
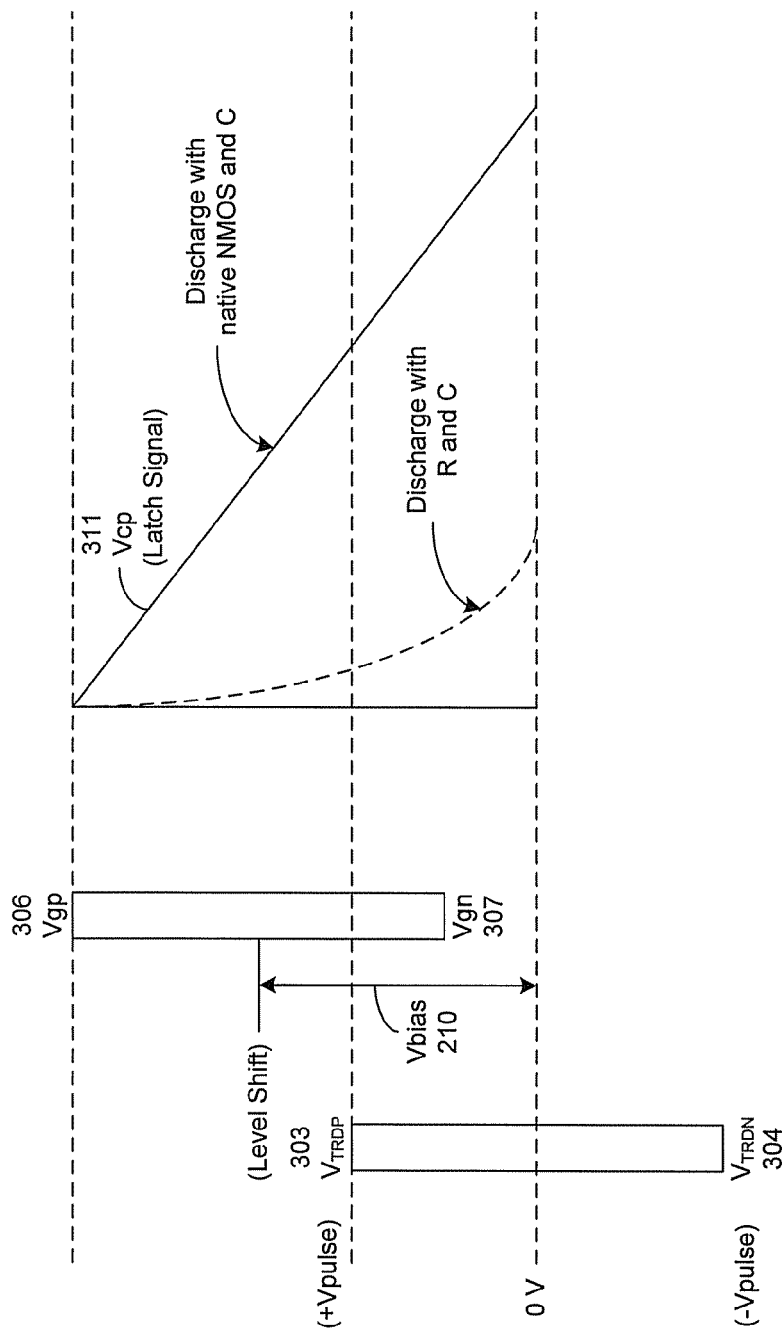
FIG. 3 is a block diagram illustrating exemplary internal signals in a pulse detector, in accordance with an embodiment of the invention.

FIG. 3 is a block diagram illustrating exemplary internal signals in a pulse detector, in accordance with an embodiment of the invention. Referring to FIG. 3, there is shown a voltage $V_{TRDP}$ 303, a voltage $V_{TRDN}$ 304, a voltage Vgp 306, a voltage Vgn 307 and a voltage Vcp 311. The voltage $V_{TRDP}$ 303 is a voltage on the terminal TRDP 103 that is described with respect to FIG. 2. The voltage $V_{TRDN}$ 304 is a voltage on the terminal TRDN 104 that is described with respect to FIG. 2. The voltage Vgp 306 is a voltage on the terminal gp 206 that is described with respect to FIG. 2. The voltage Vgn 307 is a voltage on the terminal gn 207 that is described with respect to FIG. 2. The voltage Vcp 311 is a voltage on the terminal cp 211 that is described with respect to FIG. 2.

In an exemplary embodiment of the invention, while an IC chip 100 which comprises a pulse detector such as the pulse detector 112 starts to communicate with a partner chip such as the partner chip 130, differential signal pulses may be AC coupled from the terminals TRDP 103 and TRDN 104. In this regard, for example, the voltage $V_{TRDP}$ 303 may be equal to the voltage +Vpulse and the voltage $V_{TRDN}$ 304 may be equal to the voltage −Vpulse. The voltage +Vpulse may be at minimum 300 mV, for example. The pulse width of the voltage $V_{TRDP}$ 303 or the voltage $V_{TRDN}$ 304 may be greater than 20 nsec, for example. The voltage $V_{TRDP}$ 303 and the voltage $V_{TRDN}$ 304 are then level shifted by a DC bvias voltage Vbias 210 to derive the voltage Vgp 306 and the voltage Vgn 307 respectively. In this regard, the voltage Vbias 210 may be at 400 mV, for example. The voltage Vcp 311 may be discharged with the native NMOS transistor MNT1 204 and the capacitor C1 208 in FIG. 2. Due to the large R-C time constant on the drain terminal cp 211, the voltage Vcp 311 may be held for a long time to form a latch signal to turn on a latch circuit such as the latch circuit 112. For example, comparing to using a conventional RC as a loading for the PMOS switch MP1 210 in FIG. 2, the signal pulse may be held for 10 times longer using the native NMOS transistor MNT1 204 and the same capacitor C1 208.

Figure 4:
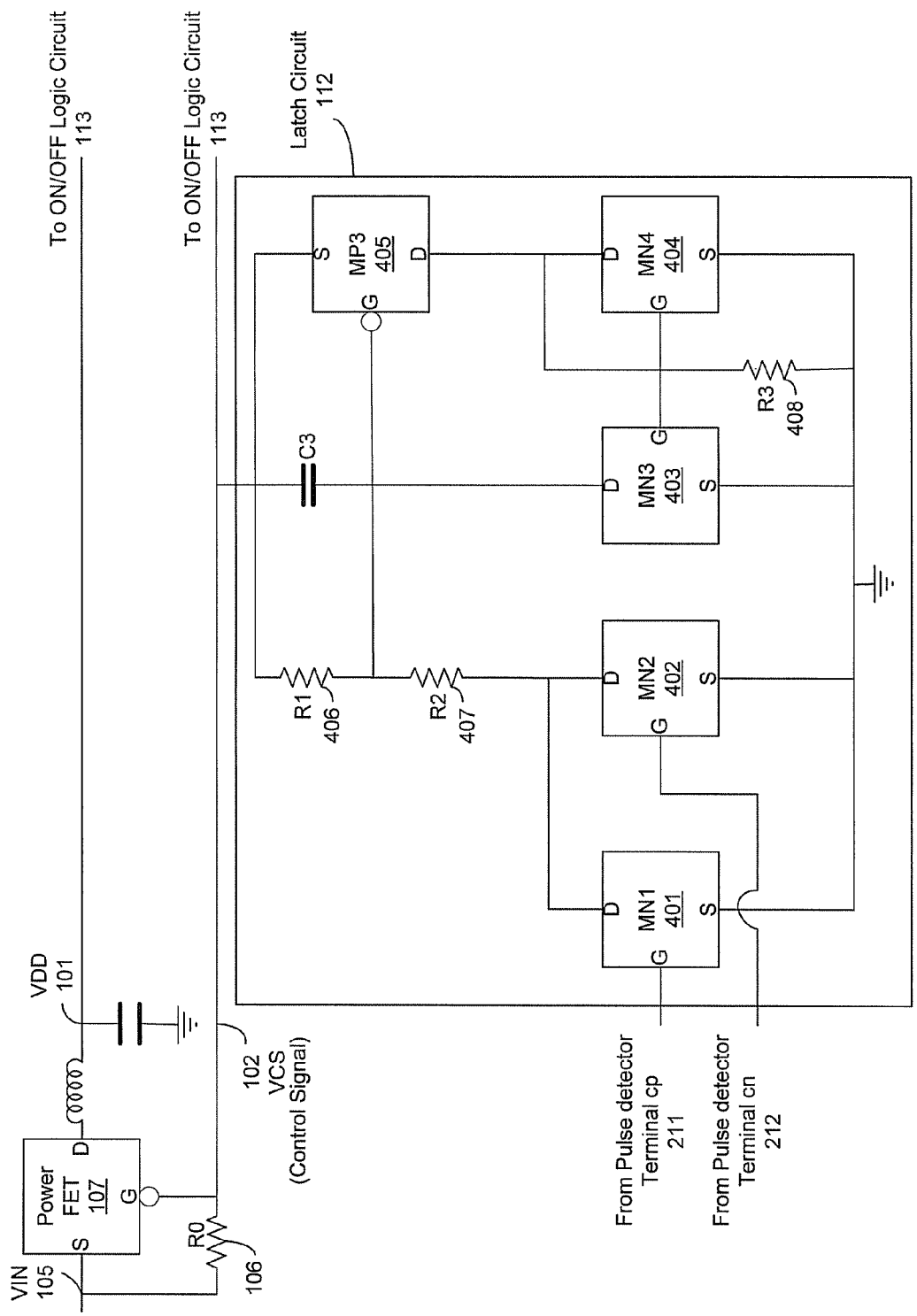
FIG. 4 is a block diagram illustrating an exemplary latch circuit that is operable to provide passive signal detector for chip auto power on and power down, in accordance with an embodiment of the invention.

FIG. 4 is a block diagram illustrating an exemplary latch circuit that is operable to provide passive signal detector for chip auto power on and power down, in accordance with an embodiment of the invention. Referring to FIG. 4, there is shown a latch circuit 112, a power FET 107 and a resistor R0 106. The latch circuit 112 may comprise a NMOS-FET MN1 401, a NMOS-FET MN2 402, a NMOS-FET MN3 403, a NMOS-FET MN4 404 and a PMOS-FET MP3 405. In an exemplary embodiment of the invention, a 3.3 V may be supplied at a source terminal VIN 105 of the power FET 107. The resistor R0 may, for example, have a value of 4.7K ohms.

In exemplary operation, while an IC chip 100, which comprises the latch circuit 111 is in idle mode, the gate voltages of the transistor MN1 401 and the transistor MN2 402 are close to 0 V and the transistor MN1 401 and the transistor MN2 402 are off. The gate of the transistor MP3 405 is pulled up to the same level as source voltage (3.3 V) by a resistor R1 406, and the gates of the transistor MN3 403 and the transistor MN4 404 are pulled down to 0 V by a resistor R3 408. In this regard, the transistors MN1 401, MN2 402, MN3 403, MN4 404 and MP3 405 in the latch circuit 112 are off in idle mode and a leakage current is very small.

When the incoming signal pulse is sampled and amplified on the drain terminal cp 211 in the pulse detector 111 described with respect to FIG. 2, the transistor MN1 401 may be turned on by the amplified signal on the drain terminal cp 211. The gate voltage of the transistor MP3 405 will drop because that this node is discharging though a resistor R2 407. Due to the large R-C time constant on the drain terminal cp 211 and the incoming signal pulse being held on for relatively long time (>1 us), the gate of the transistor MP3 405 may be pulled down below a threshold voltage and turn on the transistor MP3 405. Most of the current from the transistor MP3 405 feeding into the transistor MN4 404 may build a gate to source voltage (Vgs) on the gate of the transistor MN4 404. This gate to source voltage (Vgs) may turn on the transistor MN3 403 and further pull down the gate of the transistor MP3 405. This is a positive loop and the big current on the transistor MP3 405 may pull down the voltage on a terminal VCS 102 of the IC chip 100 to a stable low voltage. The voltage on the terminal VCS 102 may be expressed utilizing the following exemplary relationship:

$$\text{Voltage on terminal VCS 102} = Vgs\ (MN4\ 404) + Vds\ (MP3\ 405) \quad (4)$$

This voltage on the terminal VCS 102 may be 0.7 V-1 V depending on different process variations. This low voltage on the terminal VCS 102 may turn on the power FET 107 and begin to charge a terminal VDD 101 of the IC chip 100. Because of the big capacitance on the terminal VDD 101, usually it will take several hundred microseconds to 1 millisecond to charge up the power supply terminal VDD 101 of the IC chip 100. In this regard, the latch circuit 112 may keep the voltage on the terminal VCS 102 in the stable low voltage until the terminal VDD 101 is charged up.

Figure 5:
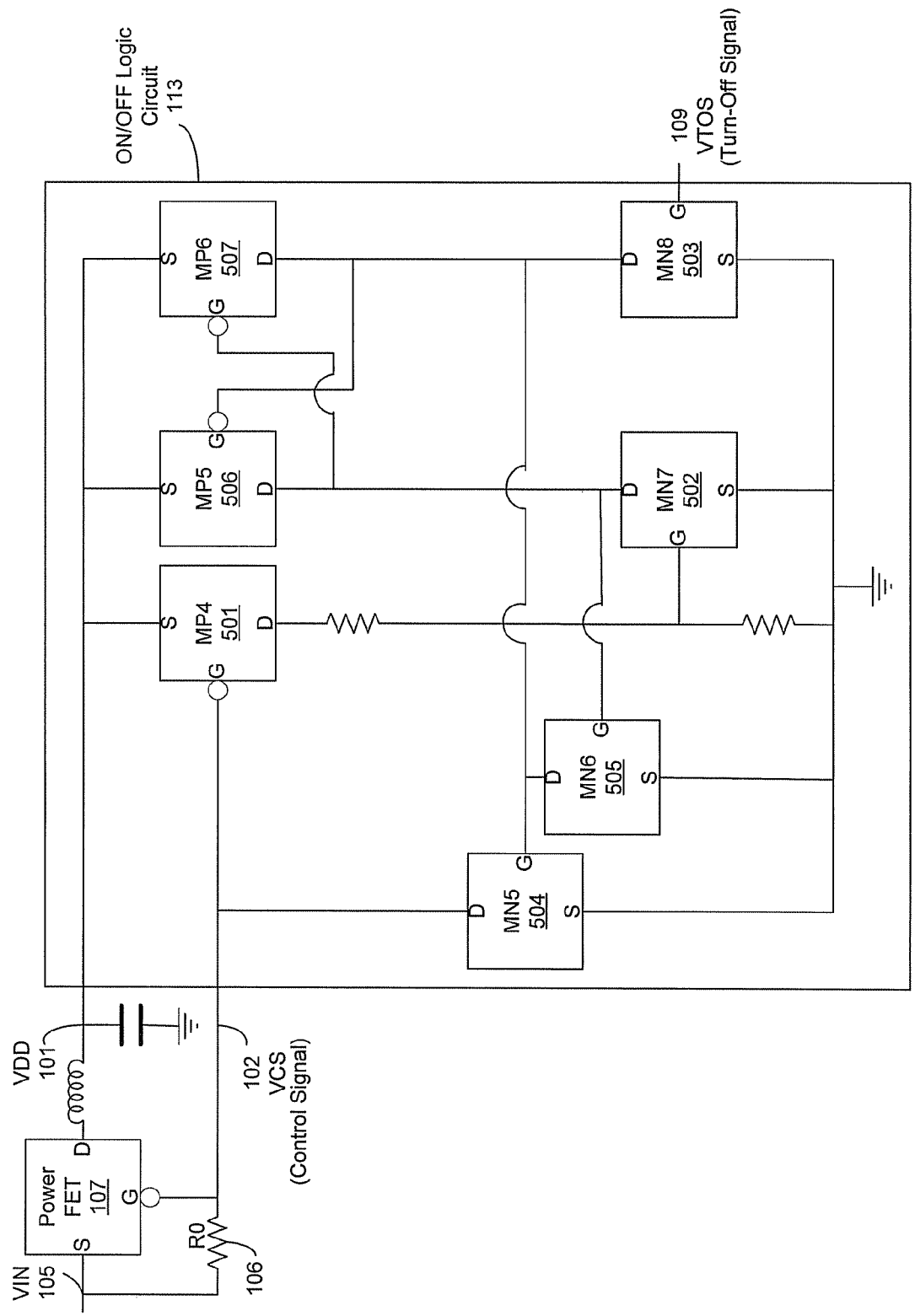
FIG. 5 is a block diagram illustrating an exemplary ON/OFF logic circuit that is operable to provide passive signal detector for chip auto power on and power down, in accordance with an embodiment of the invention.

FIG. 5 is a block diagram illustrating an exemplary ON/OFF logic circuit that is operable to provide passive signal detector for chip auto power on and power down, in accordance with an embodiment of the invention. Referring to FIG. 5, there is shown an ON/OFF logic circuit 113, a power FET 107 and a resistor R0 106. The ON/OFF logic circuit 113 may comprise a NMOS-FET MN5 504, a NMOS-FET MN6 505, a NMOS-FET MN7 502, a NMOS-FET MN8 503 and a PMOS-FET MP4 501, a PMOS-FET MP5 506 and a PMOS-FET MP6 507. In an exemplary embodiment of the invention, a 3.3 V may be supplied at a source terminal VIN 105 of the power FET 107. The resistor R0 may, for example, have a value of 4.7K ohms.

In exemplary operation, while a terminal VDD 101 of an IC chip 100 which comprises the ON/OFF logic circuit 113 is charged up high enough during powering on of the IC chip 100, the transistor MP4 501 whose gate is connected to a terminal VCS 102 of the IC chip 100 may be turned on. In this regard, the gate of the transistor MN7 502 may receive a high voltage while a gate terminal VTOS 109 of the transistor MN8 503 may be kept at a low or zero voltage. The gate of the transistor MN7 502 may receive a high voltage which may be equivalent to half of the voltage on the terminal VDD 101, for example. In this instance, the gate of the transistor MN5 504 may be at a high voltage and further pull down the terminal VCS 102 to 0 V. After the terminal VDD 101 has been powered up and the terminal VCS 102 is kept at 0 V, the latch circuit 112 and the pulse detector 111 may be disabled accordingly.

After the IC chip 100 finishes a communication with a partner chip such as, the partner chip 130, the whole IC chip 100 may need to be powered down to save power in idle mode. In such an instance, the IC chip 100 may generate a turn-off signal with a high voltage on the gate terminal VTOS 109 of the transistor MN8 503. This high turn-off signal may turn on the transistor MN8 503 and may pull the gate of the transistor MN5 504 to ground. The transistor MN5 504 is turned off and a control signal at the terminal VCS 102 may be pulled up to 3.3 V by the 4.7k resistor R0 106. Because of the resistors R1 406 and R3 408 in the latch circuit 112, the gates of the transistors MP3 405, MN3 403 and MN4 404 may follow the sources. Accordingly, this may avoid the latch circuit 112 goes back to a latched operation mode when the terminal VCS 102 is charged up to 3.3 V.

When the terminal VCS 102 becomes high (3.3 V), the transistor MP4 501 is turned off and the gate of the transistor MN7 502 may drop to ground (0 V). Because that the transistor MN7 502 is off, the gate of the transistor MN6 505 may be biased by the voltage on the terminal VDD 101 and may keep the transistor MN6 505 staying on. In this regard, the transistor MN6 505 may keep the gate of the transistor MN5 504 tying to ground.

Since the control signal at the terminal VCS 102 is high now, the power FET 107 may be turned off and the voltage on the terminal VDD 101 of the IC chip 100 may begin to drop though internal discharge paths. Due to the big capacitance on the terminal VDD 101, it may take several milliseconds for the voltage on the terminal VDD 101 to drop, for example. The gate voltage of the transistor MN6 505 may be kept the same as the voltage on the terminal VDD 101. Therefore, the gate of the transistor MN5 504 may be kept low during powering down of the IC chip 100, even when the high turn-off signal at the terminal VTOS 109 may become not valid such as., for example, may become 0 V due to that the voltage on the terminal VDD 101 drops below a certain low voltage level. In this regard, the ON/OFF logic circuit 113 may keep working until the terminal VDD 101 drops to 0 V.

Figure 6:
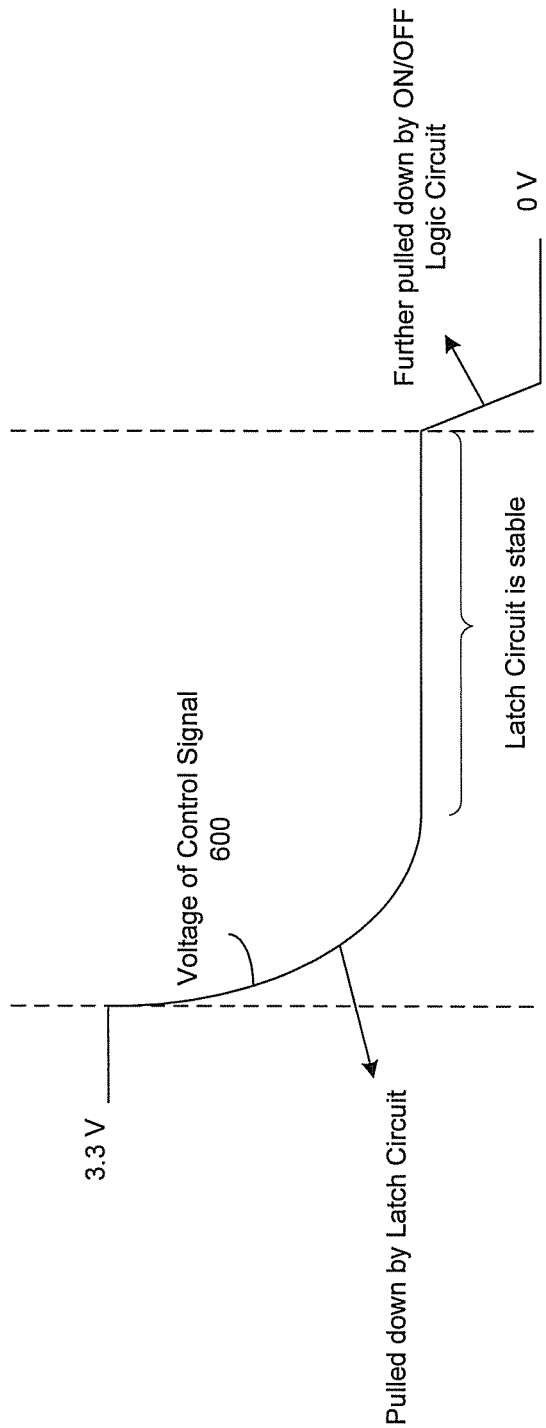
FIG. 6 is a block diagram illustrating an exemplary voltage of a control signal during powering on of an IC chip, in accordance with an embodiment of the invention.

FIG. 6 is a block diagram illustrating an exemplary voltage of a control signal during powering on of an IC chip, in accordance with an embodiment of the invention. Referring to FIG. 6, there is shown a voltage of control signal 600.

In an exemplary embodiment of the invention, while the IC chip 100 is in idle mode, the voltage of control signal 600 on the terminal VCS 102 of the IC chip 100 may be a high voltage such as 3.3 V. When the incoming signal pulse is sampled and amplified by the pulse detector 111 in the IC chip 100, the voltage of control signal 600 may be pulled down by the latch circuit 112 in the IC chip 100 until to a stable low voltage during powering on of the IC chip 100. In this regard, the stable low voltage may be, for example, 0.7 V-1 V depending on different process variations. When the terminal VDD 101 of the IC chip 100 is charged up high enough to turn on the ON/OFF logic circuit 113 in the IC chip 100 during powering on of the IC chip 100, the voltage of control signal 600 may be further pulled down by the ON/OFF logic circuit 113 to 0V.

Figure 7:
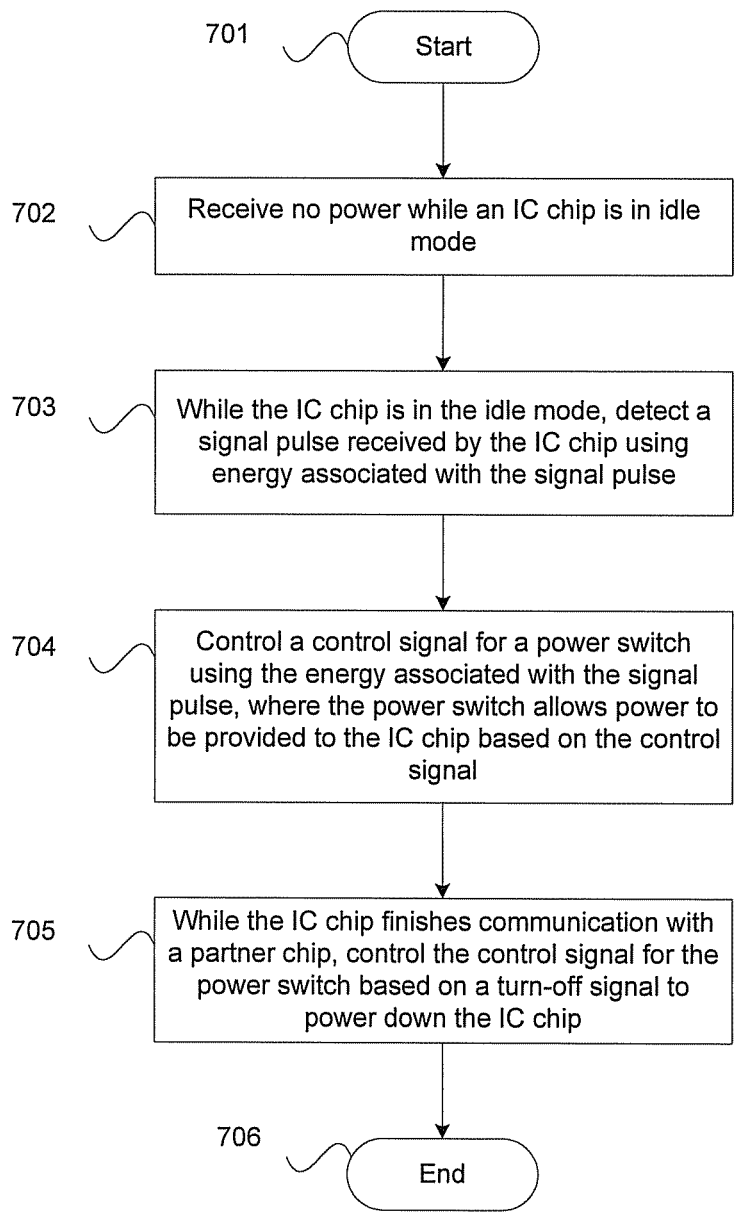
FIG. 7 is a flow chart illustrating exemplary steps for providing passive signal detector for chip auto power on and power down, in accordance with an embodiment of the invention.

FIG. 7 is a flow chart illustrating exemplary steps for providing passive signal detector for chip auto power on and power down, in accordance with an embodiment of the invention. Referring to FIG. 7, the exemplary steps start at step 701. In step 702, the IC chip 100 may receive no power while the IC chip 100 is in idle mode. In step 703, while the IC chip 100 is in the idle mode, the IC chip 100 may be operable to detect a signal pulse received by the IC chip 100 such as, for example, received from a partner chip 130. The signal pulse may be detected by the IC chip 100 using the pulse detector 111. In step 704, The IC chip 100 may be operable to control a control signal at the terminal VCS 102 for a power switch 150 such as a power FET 107 using the energy associated with the signal pulse. The power switch 150 such as the power FET 107 may allow the power to be provided to the IC chip 100 based on the control signal. The control signal may be controlled by the IC chip 100 using the latch circuit 112 and/or the ON/OF logic circuit 113. In step 705, while the IC chip 100 finishes or stops communication with a partner chip such as the partner chip 130, the IC chip 100 may be operable to control the control signal for the power switch 150 such as the power FET 107 based on a turn-off signal at the terminal VTOS 109 to power down the IC chip 100. The control signal may be controlled by the IC chip 100 using the ON/OF logic circuit 113 for powering down the IC chip 100. The exemplary steps may proceed to the end step 706.

In various embodiments of the invention, while an IC chip 100 is in idle mode with no power being supplied to the IC chip 100, the IC chip 100 may be operable to detect a signal pulse received by the IC chip 100 using energy associated with the signal pulse. The IC chip 100 may be operable to control a control signal at a terminal VCS 102 for a power switch 150 such as, for example, a power FET 107 using the energy associated with the signal pulse. The power switch 150 such as the power FET 107 may allow power to be provided to the IC chip 100 via a terminal VDD 101 based on the control signal. In this regard, the IC chip may comprise a pulse detector 111, a latch circuit 112 and an ON/OFF logic circuit 113 within the IC chip 100. The power switch 150 may comprise, for example, one of the off-chip power FET 107, an on-chip power FET 151, an off-chip electronic regulator 153 and/or an on-chip electronic regulator 152.

The IC chip 100 may be operable to amplify the detected signal pulse by level shifting with a DC bias voltage V bias 210 using the pulse detector 111. The IC chip 100 may generate a latch signal to turn on the latch circuit 112 by holding the amplified signal pulse for a first particular time period using the pulse detector 111. While the latch circuit 112 is turned on by the latch signal, the control signal may be pulled down by the IC chip 100 from a high voltage such as 3.3 V to a low voltage to turn on the power switch 150 such as the power FET 107 for powering on the IC chip 100, using the latch circuit 112. The low voltage may be 0.7 V-1 V depending on different process variations. The control signal may then be held at the low voltage by the IC chip 100 for a second particular time period during the powering on of the IC chip 100 using the latch circuit 112. While the IC chip 100 is provided with a voltage that turns on the ON/OFF logic circuit 113 during the powering on of the IC chip 100, the control signal may be further pulled down by the IC chip 100 from the low voltage to zero voltage (0 V) until the IC chip 100 is fully powered, using the ON/OFF logic circuit 113.

While the IC chip 100 is fully powered and communication with a partner chip such as the partner chip 130 is finished, the IC chip 100 may be operable to pull up the control signal from zero voltage (0 V) to the high voltage (3.3 V) to turn off the power switch 150 such as the power FET 107 for powering down the IC chip 100 based on a turn-off signal at a terminal VTOS 109, using the ON/OFF logic circuit 113. The control signal may then be held by the IC chip 100 at the high voltage (3.3 V) for a third particular time period during the powering down of the IC chip 100 until the IC chip 100 is completely powered down, using the ON/OFF logic circuit 113.

Other embodiments of the invention may provide a non-transitory computer readable medium and/or storage medium, and/or a non-transitory machine readable medium and/or storage medium, having stored thereon, a machine code and/or a computer program having at least one code section executable by a machine and/or a computer, thereby causing the machine and/or computer to perform the steps as described herein for passive signal detector for chip auto power on and power down.

Accordingly, the present invention may be realized in hardware, software, or a combination of hardware and software. The present invention may be realized in a centralized fashion in at least one computer system or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for controlling power of an integrated circuit (IC) chip that includes a pulse detector, a latch circuit, and an ON/OFF logic circuit, the method comprising:
   detecting, by the pulse detector, a signal pulse generated by a partner chip while the IC chip is in an idle mode;
   amplifying, by the pulse detector, the detected signal pulse by level shifting with a DC bias voltage;
   generating, by the pulse detector, a latch signal to turn on the latch circuit;
   decreasing, by the latch circuit, a control signal from a high voltage to a low voltage so as to turn on a power switch that powers on the IC chip;
   maintaining, by the latch circuit, the control signal at the low voltage for a predetermined time period during the powering on of the IC chip; and
   decreasing, by the ON/OFF logic circuit, the control signal from the low voltage to a zero voltage until IC chip is fully powered on.

2. The method according to claim 1, wherein
   the low voltage is between 0.7V to 1.0V; and
   the high voltage is 3.3V.

3. A method for controlling power of an IC chip that includes a pulse detector, a latch circuit, and an ON/OFF logic circuit, the method comprising:
   while the IC chip is in an idle mode, detecting, by the pulse detector, a signal pulse generated by a partner chip and generating, by the pulse detector, a latch signal to turn on the latch circuit;
   decreasing, by the latch circuit, a control signal from a high voltage to a low voltage and maintaining at the low voltage for a predetermined time period so as to turn on a power switch that powers on the IC chip; and
   further decreasing, by the ON/OFF logic circuit, the control signal from the low voltage to a zero voltage to keep the IC chip fully powered on.

4. The method according to claim 3, further comprising:
   amplifying, by the pulse detector, the detected signal pulse by level shifting with a DC bias voltage.

5. The method according to claim 4, further comprising:
   while the IC chip is fully powered on and communication with the partner chip is finished, increasing, by the ON/OFF logic circuit, the control signal from the zero voltage to the high voltage to turn off the power switch for powering down the IC chip based on a turn-off signal.

6. The method according to claim 3, wherein the power switch comprises one of an off-chip power field-effect transistor (FET) coupled to the IC chip, an on-chip power FET within the IC chip, an off-chip electronic regulator coupled to the IC chip and/or an on-chip electronic regulator within the IC chip.

7. The method according to claim 3, further comprising:
   while the IC chip is fully powered on and communication with the partner chip is finished, increasing, by the ON/OFF logic circuit, the control signal from the zero voltage to the high voltage to turn off the power switch for powering down the IC chip based on a turn-off signal.

8. The method according to claim 7, further comprising:
   holding, by the ON/OFF logic circuit, the control signal at the high voltage for a predetermined time period during the powering down of the IC chip until the IC chip is completely powered down.

9. The method according to claim 3, wherein the low voltage is between 7V to 1.0V.

10. The method according to claim 3, wherein the high voltage is 3.3V.

11. A system for controlling power of an IC chip that includes a pulse detector, a latch circuit, and an ON/OFF logic circuit, the system comprising:
    while the IC chip is in an idle mode, the pulse detector is configured to detect a signal pulse generated by a partner chip and to generate a latch signal to turn on the latch circuit;
    the latch circuit is configured to decrease a control signal from a high voltage to a low voltage and maintain at the low voltage for a predetermined time period so as to turn on a power switch that powers on the IC chip; and
    the ON/OFF logic circuit is configured to further decrease the control signal from the low voltage to a zero voltage to keep the IC chip fully powered on.

12. The system according to claim 11, wherein the pulse detector is configured to amplify the detected signal pulse by level shifting with a DC bias voltage.

13. The system according to claim 12, wherein the latch circuit is configured to maintain the control signal at the low voltage for a predetermined time period during the powering on of the IC chip.

14. The system according to claim 11, wherein the power switch comprises one of an off-chip power field-effect transistor (FET) coupled to the IC chip, an on-chip power FET within the IC chip, an off-chip electronic regulator coupled to the IC chip and/or an on-chip electronic regulator within the IC chip.

15. The system according to claim 11, wherein the ON/OFF logic circuit is configured to increase the control signal from the zero voltage to the high voltage to turn off the power switch for powering down the IC chip based on a turn-off signal, while the IC chip is fully powered on and communication with the partner chip is finished.

16. The system according to claim 15, wherein the ON/OFF logic circuit is configured to hold the control signal at the high voltage for a predetermined time period during the powering down of the IC chip until the IC chip is completely powered down.

17. The system according to claim 11, wherein the high voltage is 3.3V.

18. The system according to claim 11, wherein the low voltage is between 0.7V to 1.0V.

* * * * *